J. F. SANBORN.
Churn.

No. 48,449.

Patented June 27, 1865.

Witnesses:

Inventor.

UNITED STATES PATENT OFFICE.

J. F. SANBORN, OF HARDWICK, VERMONT.

IMPROVEMENT IN CHURNS.

Specification forming part of Letters Patent No. 48,449, dated June 27, 1865.

*To all whom it may concern:*

Be it known that I, J. F. SANBORN, of Hardwick, in the county of Caledonia and State of Vermont, have invented a new and Improved Churn; and I do hereby declare that the following is a full, clear, and exact description thereof, reference being had to the accompanying drawings, making a part of this specification, in which—

Figure 1:
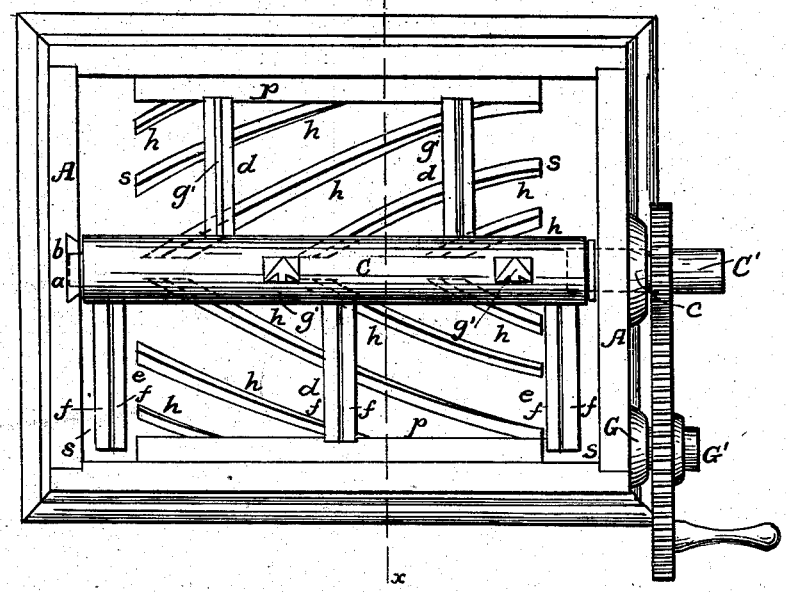
Figure 2:
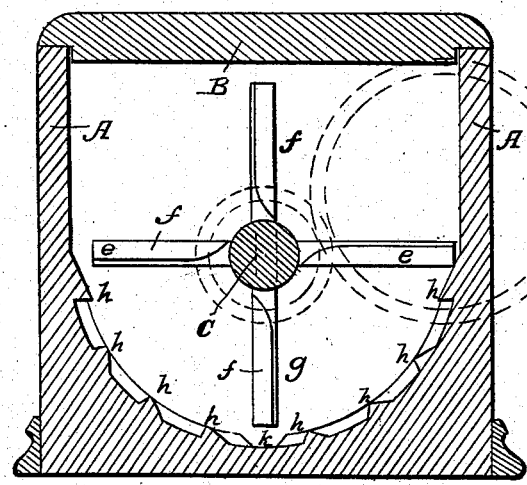
Figure 3:
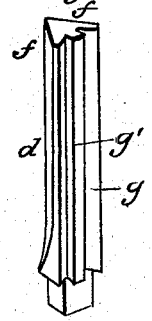

Figure 1 is a top view of my improved churn with the cover removed. Fig. 2 is a vertical transverse section through the churn. Fig. 3 is a perspective view of one of the revolving beaters.

Similar letters of reference indicate corresponding parts in the three figures.

One object of my invention is to contrive a churn which will be efficient for producing butter from cream, and then serve as a butter-worker for washing and mixing salt with the butter, as will be hereinafter described.

Another object of my invention is to construct the beaters which agitate the cream and break up the butter-globules in such manner that they will carry air with them down beneath the surface of the cream during the operation of churning, and also present concave and polygonal faces to the cream when the dasher-shaft is turned in one direction and acute, or nearly acute, angled faces to the cream when the said shaft is turned in an opposite direction, as will be hereinafter described.

Another object of my invention is to combine revolving radial beaters with a ribbed concave in such manner that the cream is acted upon at every point in the churn-box by the conjoint operation of said ribs and beaters, as will be hereinafter described.

To enable others skilled in the art to understand my invention, I will describe its construction and operation.

The churn-box is constructed with vertical sides and ends and a semicircular or concave bottom. This box A is provided with a tightly-fitting cover, B, and also with a horizontal shaft, C, extending longitudinally through the box or supported upon suitable bearings within the box. I prefer to apply the shaft C in such manner that it can be removed from the box or replaced therein; and for this purpose one end of the shaft has a pin, $a$, projecting from it and seated in a recess in the box, which pin is held down in place by means of a dovetail slide, $b$. The opposite end of the shaft C has a square slot formed in it to receive a tenon which projects from the enlarged inner end of a short shaft, C', that passes tightly through the box A, and receives a spur-wheel, $c$, on its outer end, as shown in Fig. 1. By drawing out the slide $b$ the shaft C can be removed from the churn-box. Shaft C carries a number of radial beaters, $d$ $d$ and $e$ $e$, which are secured to it at right angles to its axis. These beaters are constructed with two beveled sides, $f f$, and one concave side, $g$, having a central rib, $g'$, extending from the shaft to the extremity of the beater. The ribs $g'$ present three sides, and form channels on the beaters, which present concave surfaces and form chambers for gathering and carrying air beneath the surface of the cream when the shaft C is revolved. By constructing one face of each beater with a square-cornered rib, $g$, and a channel on each side of it, I have found that the beaters will operate to the best advantage to rupture the oil-globules and to agitate the entire contents of the churn-box. The opposite faces, $f f$, of the beaters form kind of paddles for gathering and working the butter and mixing salt with it when the shaft C is turned in an opposite direction to that required for churning.

The inner concave surface of the churn-box is furnished with beveled ribs $h$ $h$, arranged in oblique lines on each side of the center of the churn-box, and all inclining in one direction, as shown in Fig. 1. These oblique ribs or ridges terminate at their lowest ends in a channel, $k$, which extends centrally from one end to the other of the churn-box, and at their upper ends the ribs $h$ $h$ terminate beneath inclined ledges $p$ $p$, which extend in longitudinal directions nearly to the ends of the churn-box, as shown in Fig. 1. These ribs $h$ $h$ are intended to compel the cream to flow toward one end of the churn-box and to that end toward which they all incline. These currents are interrupted by the revolving beaters, which part the cream and dash it against the angles of the ribs with considerable force. The beaters $e$ $e$ are somewhat longer than the beaters $d$ $d$, and they work very close to the bottom and side or ends of the churn-box, so as to prevent a stagnation of cream at these points. In order to allow the ends of said beaters $e$ $e$ to work closely to the semicircular bottom or concave, uninterrupted spaces *s s* are left, as shown in Fig. 1.

In practice I prefer to form the oblique ribs *h h* upon the interior surface of the concave; but, if desired, the ribs may be secured to the surface. I shall also perforate the churn-box near its upper edge for the purpose of admitting of the ingress of air to be carried beneath the surface of the cream by the beaters during the process of churning.

The shaft C is driven by means of a crank spur-wheel, G, which may be applied directly upon this shaft, or it may be applied to a short shaft, G', and made to engage with the pinion *c* on the shaft C'.

By arranging the slats or ribs *h h* diagonally upon the concave bottom of the churn-box, I obtain a complete butter-worker for gathering the particles of butter and washing the buttermilk out of the butter. At the same time I prevent the butter from being brought to a lump too quickly to prevent it from being properly salted.

Having thus described my invention, what I claim as new, and desire to secure by Letters Patent, is—

1. The arrangement of revolving staves or beaters, which are adapted for producing butter from cream and then working the butter, in conjunction with the obliquely-ribbed concave, substantially as described.

2. Providing the beaters *d d* with two channels which are separated by a central rib, *g*, for the purpose and in the manner described.

3. The arrangement of the ribs *h h* upon the surface of the concave bottom of the churn-box, so that these ribs all incline toward the center of the bottom of the box and toward one end thereof, substantially as described.

4. The oblique ribs *h h*, terminating a short distance from the ends of the churn-box, so as to leave an unobstructed space between the ends of the ribs and the ends of the box, in combination with the long and short staves *d d* and *e e* of the dasher-shaft, substantially in the manner and for the purpose described.

J. F. SANBORN.

Witnesses:
   JOHN H. GEORGE,
   E. H. GEORGE.